No. 875,509.
PATENTED DEC. 31, 1907.
L. J. ELLIS.
COOKING OR CULINARY UTENSIL.
APPLICATION FILED JAN. 5, 1906.
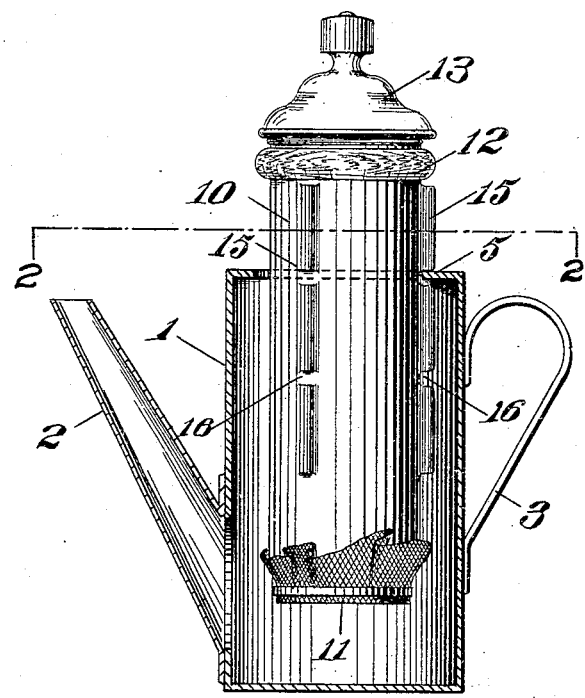
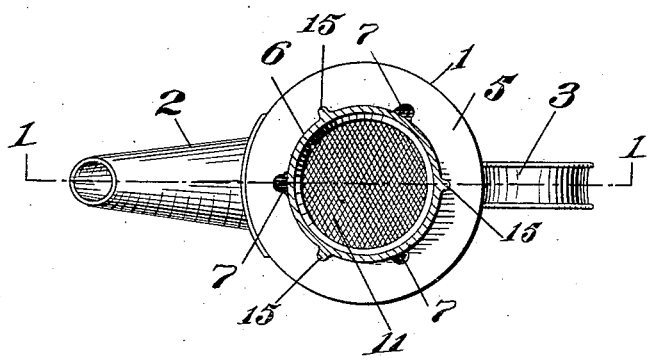
Witnesses
Inventor
Leroy J. Ellis,
By his Attorneys

UNITED STATES PATENT OFFICE.

LEROY J. ELLIS, OF FANWOOD, NEW JERSEY.

COOKING OR CULINARY UTENSIL.

No. 875,509.  Specification of Letters Patent.  Patented Dec. 31, 1907.

Application filed January 5, 1906. Serial No. 294,765.

*To all whom it may concern:*

Be it known that I, LEROY J. ELLIS, a citizen of the United States, and a resident of Fanwood, in the county of Union and State of New Jersey, have invented certain new and useful Improvements in Cooking or Culinary Utensils, of which the following is a specification.

The present invention relates to improvements in the class of culinary utensils in which an interior vessel is supported in an outer receptacle. In this type of utensils the outer receptacle is usually formed with a bottom, adapting it to contain water, but said receptacle is sometimes made without a bottom to act as a flue or jacket for confining the heat around the inner vessel. The inner vessel may be formed with a bottom, as in the case of steam cookers or when used with the bottomless outer receptacle, or the inner vessel may be provided with a percolator bottom, adapting the utensil particularly for brewing coffee, in which case, the outer receptacle (or coffee pot) must, of course, have a bottom.
My improved cooking or culinary utensil comprises a suitable outer receptacle (with or without a bottom) having an open mouth, and an inner vessel fitting snugly within the open mouth of the receptacle, and lugs, ribs or flanges formed on one of said members and engaging the other so as to hold the inner vessel in the desired position of adjustment in the outer receptacle. The lugs, ribs or flanges are preferably secured to the outer surface of the inner vessel, in which case the mouth of the receptacle is notched or recessed to receive the lugs, ribs or flanges of the vessel. These lugs, ribs or flanges upon the surface of the inner vessel may be vertical or inclined with relation to the length of the inner vessel, but in the case of forming these lugs, ribs or flanges vertical or parallel with relation to the length of the inner vessel, it is necessary to notch or recess them transversely to form shoulders for the engagement of the wall of the mouth of the receptacle for holding the inner vessel in the desired adjusted position. The lugs, ribs or flanges may also be in the form of projections extending from the wall of the mouth of the outer receptacle, in which case the wall of the inner vessel must be formed with grooves or channels with which said projections engage.
I prefer to form the inner vessel with a suitable handle of non-conducting material such as wood, which handle may conveniently be in the form of a wooden ring properly secured to the upper end of the inner vessel. A tightly fitting cover should preferably be used for closing the open upper end of the inner vessel, and in the application of my cooking utensil for brewing coffee, the lower end of the inner vessel is covered with a percolator gauze or cloth, preferably detachably secured in the manner well understood. The inner vessel is preferably formed of glass or porcelain, but it may conveniently be formed of tin or other material, which is commonly used in the manufacture of cooking utensils.

In order that my invention may be fully understood, I will first describe the same with reference to the accompanying drawing and afterwards point out the novelty more particularly in the annexed claims.

In said drawing: Figure 1 is a vertical sectional view of my improved cooking or culinary vessel illustrated in the form of a coffee pot, taken on line 1—1 of Fig. 2. Fig. 2 is a horizontal sectional view taken on the line 2—2 of Fig. 1.

I have illustrated, and will now describe, my invention in its application to a coffee pot; but I would have it understood that I do not intend to limit my invention to this use as a coffee pot, but intend to cover it as a cooking or culinary utensil for any purpose to which my invention may be applicable. With this explanation, it will be clear that it is immaterial to the nature and scope of my invention, what form of outer receptacle is used, or whether it is made with or without a bottom or whether the inner vessel is provided with a percolator bottom or a closed bottom; the main feature of my invention relating to the means for holding the inner vessel in the desired adjusted position within the outer receptacle or support.

1 is a receptacle, shown in the form of a coffee-pot, with a spout 2, and a handle 3. The spout 2 may be omitted, and the form of handle 3 may be changed when the receptacle is designed to contain water for other cooking purposes. The bottom of receptacle 1 may also be omitted when it is to serve only as a supporting casing for confining the heat around the inner vessel hereinafter referred to. The outer receptacle 1 is formed at its top with an inturned flange or annular supporting plate 5, forming the wall of the open mouth 6. This annular top or plate 5 is notched or recessed at intervals, as shown at 7 for the purpose which will presently appear.

10 is the inner vessel which is preferably formed of glass or porcelain, but may be formed of tin or other material usually employed in the manufacture of cooking utensils. The lower end of the inner vessel 10 is covered with a removable percolator gauze or cloth 11 for the purpose which is well understood. For steam cooking, and for use with the open bottom outer receptacle the lower end of vessel 10 may have an imperforate bottom.

Adjacent to the top upon the outer surface of the inner vessel 10 is secured a ring of wood or other non-heat-conducting material 12, which forms a handle by which the inner vessel may be handled and adjusted. Other forms of handles may be used if preferred. The top of the inner vessel 10 is tightly closed by a snugly fitting cover 13 of ordinary construction.

In order to support the inner vessel 10 in the desired adjusted position within the outer receptacle 1, or annular plate 5 I form upon or otherwise rigidly secure to one of said members, a series of lugs, ribs or flanges, which are adapted to engage parts upon the other of said members. In Figs. 1 and 2 these ribs or flanges are shown upon vessel 10 in the form of vertical ribs or flanges 15, which are notched or recessed transversely at intervals, as shown at 16. These ribs or flanges 15 are properly spaced around the cylindrical surface of vessel 10 to fit in and slide through the notches or recesses 7 of the top wall or flange 5 of receptacle 1 so as to allow the free vertical movement of the vessel 10 within the receptacle 1. The vessel 10 is moved vertically within the receptacle 1 by taking hold of the handle ring 12, and when it is desired to support the vessel at any given position within the receptacle, the vessel 10 is rotated with the notches 16 in the plane of top flange 5 of the vessel 1, said notches engaging the top flange of the receptacle and supporting the vessel against vertical displacement. To remove or further adjust the vessel 10, it will be understood that the vessel must again be rotated to bring the ribs or flanges 15 into alinement with the notches 7, when the vessel 10 will freely move vertically in the receptacle 1.

The utility of my invention will be clearly understood without detail explanation. In brewing coffee, the ground coffee is, of course, placed within the vessel 10 upon the percolator cloth or gauze 11, and boiling water poured into the top of the vessel 10. In starting the operation, the vessel 10 may be allowed to remain in its lowermost position so as to retain the coffee submerged in the boiling water during the few moments of boiling or brewing after which the vessel 10 is preferably raised in the receptacle and supported above the liquid to drain, thereby avoiding the deleterious effect of allowing the coffee grounds to remain too long in the liquor. Or, by supporting vessel 10 at a sufficient distance above the bottom of the receptacle 1, with the ground coffee in vessel 10, what is known as "drip coffee" can be made by pouring the boiling water upon the coffee and allowing it to percolate through.

Other forms of cooking utensils embodying my invention will readily suggest themselves from the foregoing specification:—my invention relating to the means for adjustably supporting an inner vessel in an outer receptacle.

I designate as shoulders or ridges the equivalent and counterpart means illustrated in Figs. 1, 3 and 4 respectively, for guiding the inner vessel within the outer receptacle and retaining it at any height of adjustment; in order that it may be distinctly understood that the improvement claimed can be embodied either in the form of salient ribs as illustrated in Figs. 1, 2 and 3 or in ridges or shoulders formed by the walls or grooves as illustrated in Figs. 4 and 5, suitable notches or projections as the case may be, being arranged to coöperate either with the projecting or recessed shoulders formed by the ribs or grooves respectively as hereinafter fully described. The automatic guiding function of the elongated ribs or shoulders, in contradistinction to pins coöperating with a notched horizontal supporting flange greatly facilitates the adjustment of the inner vessel at variable height in the outer receptacle. The term "vertically elongated" applied to the guiding ribs or shoulders is not to be construed as limited to guiding ribs or the like arranged in precisely vertical position as illustrated in Fig. 1 of the drawing, but is embodied equally in a structure such as shown in Fig. 3 or Fig. 4 having inclined or oblique ribs or shoulders, elongated or extended in an approximately vertical direction and possessing the guiding function referred to.

Having thus described my invention, the following is what I claim as new therein, and desire to secure by Letters Patent:

1. In a cooking utensil the combination of a containing vessel provided on its outside with substantially vertical and transversely notched ribs or flanges and an annular supporting plate notched to receive the ribs or flanges of the containing vessel and guide them in the vertical movement of said vessel and to enter the transverse notches in the ribs or flanges thereon so as to support said vessel at variable height.

2. In a cooking utensil the combination of an outer receptacle having a notched annular plate, and a vessel contained in said outer receptacle, formed on its outside with transversely notched vertical ribs or flanges cooperating with the notched annular plate of the outer receptacle, to guide the inner vessel in its vertical movement and support it at variable height.

3. In a cooking utensil the combination of a vessel provided with vertically elongated and transversely notched ribs or flanges and a notched annular plate coöperating with the notched ribs or flanges on the vessel to guide the said vessel in vertical movement and support it in adjusted position.

4. In a cooking utensil, the combination of an outer receptacle formed with a notched or recessed mouth or opening and an inner vessel formed on its exterior with vertically elongated and transversely notched ribs or flanges coöperating with the notched or recessed mouth of the outer receptacle to support the inner vessel at different heights in said outer receptacle.

5. In a cooking utensil, the combination of an outer receptacle formed with a notched or recessed mouth or opening and an inner vessel adjustably supported in the mouth or opening of the receptacle by means of approximately vertical elongated and notched ribs or flanges, substantially as described.

LEROY J. ELLIS.

Witnesses:
Wm. P. Hammond,
Wm. E. Knight.